US008623791B2

(12) United States Patent
Yang et al.

(10) Patent No.: US 8,623,791 B2
(45) Date of Patent: Jan. 7, 2014

(54) COPOLYMER AND PREPARATION METHOD AND APPLICATION THEREOF

(75) Inventors: Xiaohua Yang, Beijing (CN); Lin Wang, Beijing (CN); Jiafen Li, Beijing (CN); Xiaolin Qian, Beijing (CN); Xianguang Wang, Beijing (CN); Sheng Li, Beijing (CN); Liwei Ren, Beijing (CN); Changming Su, Beijing (CN); Zhifa Wang, Beijing (CN); Guichuan Liu, Beijing (CN); Bingzhong Shi, Beijing (CN)

(73) Assignees: China Petroleum & Chemical Corporation, Beijing (CN); Sinopec Research Institute of Petroleum Engineering, Beijing (CN)

( * ) Notice: Subject to any disclaimer, the term of this patent is extended or adjusted under 35 U.S.C. 154(b) by 0 days.

(21) Appl. No.: 13/244,102

(22) Filed: Sep. 23, 2011

(65) Prior Publication Data

US 2012/0077718 A1    Mar. 29, 2012

(30) Foreign Application Priority Data

Sep. 29, 2010  (CN) .......................... 2010 1 0502677
Sep. 29, 2010  (CN) .......................... 2010 1 0502681
Sep. 29, 2010  (CN) .......................... 2010 1 0502685

(51) Int. Cl.
*C09K 8/12* (2006.01)
*C09K 8/32* (2006.01)
*C09K 8/588* (2006.01)

(52) U.S. Cl.
USPC ........... 507/121; 507/120; 507/122; 507/225; 507/227; 507/228

(58) Field of Classification Search
USPC .................. 507/120, 122, 225, 227, 228, 121
See application file for complete search history.

(56) References Cited

U.S. PATENT DOCUMENTS

| 3,872,047 | A | * | 3/1975  | Jandourek ..................... 523/115 |
| 3,929,482 | A | * | 12/1975 | Ponticello et al. ............ 430/627 |
| 4,500,357 | A | * | 2/1985  | Brothers et al. .................. 524/5 |

(Continued)

OTHER PUBLICATIONS

"Flocculation and characterization of protein by anionic copolymer containing reactive functional groups", Yu, et al., Colloids and Surfaces A: Physicochemical and Engineering Aspects 163 (2000), 225-232.*

(Continued)

*Primary Examiner* — Aiqun Li
(74) *Attorney, Agent, or Firm* — Novick, Kim & Lee, PLLC; Allen Xue

(57) ABSTRACT

A copolymer and preparation method and application thereof are disclosed. The copolymer is random copolymer obtained from monomers consisting of acrylamide, acrylic acid, alkenyl sulfonate, 2-acrylamido-dodecyl sulfonate, p-styrene sulfonate or isoprene sulfonate and so on. The copolymer of present invention can be used as fluid loss additive and has good fluid loss properties, which would not make the drilling fluid thicken at high temperature of 200° C. and high salt conditions of saturated brine. It has a medium-pressure fluid loss after aging and rolling for 16 h at high temperature of 200° C., as measured in accordance with the American Petroleum Institute Standard Test at room temperature, and has good properties of high temperature-resisting and salt-resisting.

22 Claims, 3 Drawing Sheets

(56) References Cited

U.S. PATENT DOCUMENTS

| | | | | |
|---|---|---|---|---|
| 4,780,517 A | * | 10/1988 | Ching | 526/304 |
| 5,032,295 A | * | 7/1991 | Matz et al. | 507/118 |
| 5,552,316 A | * | 9/1996 | Savage | 435/261 |
| 5,789,349 A | | 8/1998 | Patel | |
| 6,465,587 B1 | | 10/2002 | Bair et al. | |
| 7,651,980 B2 | | 1/2010 | Jarrett et al. | |
| 2002/0195583 A1 | * | 12/2002 | Suzuki et al. | 252/175 |

OTHER PUBLICATIONS

"Preparation of water soluble Am—AA—SSS copolymers by inverse microemulsion polymerization", Wan, et al., Polymer Bulletin (2010) 65:565-576.*

Wang Zhonghua et al. 2009, "Studies on Ultra-High Temperature Drilling Fluid System (II)—Synthesis and Evaluation of Polymer Fluid Loss Additives," Petroleum Drilling Techniques, 2009(7), Abstract.

* cited by examiner

COPOLYMER AND PREPARATION METHOD AND APPLICATION THEREOF

CROSS REFERENCE TO RELATED APPLICATIONS

This application claims priority under 35 U.S.C. §119 to Chinese Patent Application No. 201010502677.7, No. 201010502681.3, and No. 201010502685.1, all filed on Sep. 29, 2010, and each of which is hereby incorporated by reference herein in its entirety.

FIELD OF THE INVENTION

The present invention relates to a copolymer, preparation method and application thereof, more specifically, to a temperature-resisting and salt-resisting fluid loss additive copolymer for drilling fluid and the preparation method thereof, which is applicable for high temperature (above 200° C.) and high salt resisting drilling fluid systems.

BACKGROUND OF THE INVENTION

A fluid loss additive is an important treatment agent for drilling fluid in oil drilling operation. It reduces the filter loss of a drilling fluid as far as possible and reduces the harmful fluid loss to the stratum by forming a flexible thin and compact filter cake with low permeability on the wall of a well, so as to ensure the drilling work going on wheels.

With the increase of the demand for energy in the world and the development of drilling technology, the stratums being drilled become more and more complicated. The numbers of special wells, ultra-deep wells and complex wells are increasing; therefore, there exists increasing high demands for improved drilling fluid technology. For example, when the temperature of the bottom hole of a deep well rises above 200° C., it has notable effect on the properties of water-based drilling fluid. Therefore, the main problem of the water-based drilling fluid of deep well is high temperature resistance, and the key is the high temperature resisting treatment agent.

A polymer fluid loss additive is one of the most critical treatment agents that ensure the performance of the drilling fluid. Currently, the amount of polymer fluid loss additives used in the application has to be increased in order to play the role of reducing the filter loss in brine drilling fluid and at high temperature conditions. However, as the amount of polymer additives increases, the viscosity of the drilling fluid also increases due to their high relative molecular weight, thus bringing trouble to the application and limiting the use of the polymer treatment agent. Existing polymer fluid loss additives do not possess good high temperature-resistance properties, which causes a great change of rheological properties of the drilling fluid system at high temperature conditions. Thickening and/or degradation of the drilling fluid occurs at high temperature, leading to poor performance of drilling operation. For example, fluid loss additives such as sulfonated phenolic resin (SMP) meet the requirements for drilling within 200° C. However, they can't meet the requirements for high temperature and high pressure filter loss control and requirements for the control of rheology of brine and saturated brine drilling fluid under ultra-high temperature conditions.

Other high temperature-resisting fluid loss additives applicable for different stratigraphic conditions were developed in the prior art, and used in the field application. For example, polymer treatment agents with different components and different relative molecular weights synthesized by copolymerizing monomers of acryloyloxybutyl sulfonic acid, sodium 2-acryloxy-2-vinylmethyl propylsulfonate and N,N-dimethyl acryamide with acrylamide and acrylic acid and the like are disclosed by Zhonghua Wang, et al, in "Studies on Ultra-High Temperature Drilling Fluid System (II)—Synthesis and Evaluation of Polymer Fluid Loss Additives," PETROLEUM DRILLING TECHNIQUES, 2009(7), having good thermal stability and fluid loss effect in both fresh water and salt water drilling fluids. A novel high temperature water-based fluid loss additive CMJ-1 for drilling fluid was also disclosed, by Jinsheng Sun, et al, in "Development of CMJ-1 High Temperature Film-forming Fluid Loss Additive and Properties thereof," PETROLEUM DRILLING TECHNIQUES, 2004.3, which is synthesized with ethylene, acetic acid, methanol and sulfonating agent as main starting materials by high temperature oxidation, esterification, polymerization, alcoholysis and sulfonation, and it can form compact isolated films with temperature resistant up to 180° C.

U.S. Pat. No. 5,789,349 discloses an improved water-based drilling fluid system containing a controlled cross-linking polymeric fluid loss additive with good thermal stability, wherein the controlled cross-linking polymer is a copolymerization reaction product of a mixture of acrylamide, monomers with sulfonic groups, non-sulfonated anionic monomers and cross-linking agents with a certain concentration, which has temperature resistance up to 200° C.

U.S. Pat. No. 6,465,587 discloses a copolymer capable of controlling the properties of drilling fluid, which is prepared from the copolymerization reaction of acrylamide, 3-allyloxyhydroxypropanesulfonate (AHPS) and other monomers. The AHPS component is thermally and hydrolyticly stable at high pH and in saturated salt conditions, and the copolymers are especially efficacious as oil well cement slurry additives for rheology and fluid loss control at high temperature.

U.S. Pat. No. 7,651,980 discloses a water-based drilling fluid system mainly consisted of water soluble polymer comprising acrylamide monomer which can control filtration at high temperature. The system is consisted of freshwater, plugging agent with concentration of (21-58) kg/m$^3$, and an amount of bridging agent which is consisted of water-soluble polymer, and the system have good rheological properties. When contacting with a stratum with monovalent salt concentrations of no more than 10,000 ppm, the drilling fluid has effective fluid loss control, and after static aging for a period of 16 hours, with a HTHP (149° C.) filtrate amount of not more than 25 ml.

In general, with the stratum to be drilled becoming increasingly complicated, and with more and more deep well and ultra-deep well appeared, the temperature at the bottom hole can be up to 200-250° C. or more. Thus there exists increasing high demands for the drilling fluid technology. The fluid loss additive is one of the most critical treatment agents which can ensure the properties of the drilling fluid. The amount of the polymer fluid loss additives in the prior art has to be increased in order to play the role of reducing the filter loss in brine drilling fluid and at high temperature conditions, due to their high relative molecular weight, which causes increasing of the viscosity of the drilling fluid, or difficulties in controlling the rheological properties of the drilling fluid due to the thickening or degradation of the polymers at high temperature. Existing fluid loss additives such as sulfonated phenolic resin (SMP) can meet the demand for drilling within 200° C., but not meet the demand for filter loss control at high temperature and high pressure and demand for rheology for brine and saturated brine drilling fluid under ultra-high temperature conditions. What is needed are fluid loss additives that have all the desired properties.

SUMMARY

Provided herein are high temperature-resisting and salt-resisting fluid loss additives for drilling fluid prepared by using different monomers and molecular weight regulators and controlling the molecular weight of the polymers, which comprise several temperature-resisting and salt-resisting fluid loss additives with different structures and different molecular weight range.

In one aspect, the present invention relates to copolymers that function as high temperature-resisting and salt-resisting fluid loss additives for drilling fluid. In some embodiments, the copolymers of present invention are random copolymers comprise at least one A monomer, one B monomer and one C monomer.

In another aspect, the present invention provides a method of preparing the copolymer, comprising the steps of: (1) adding the said monomer component and molecular weight regulator into a reactor containing water, and adding alkaline substances into the monomers aqueous solution to adjust the pH of the polymerization system to alkaline conditions; (2) adding initiators into the polymerization system to initiate the polymerization reaction; (3) shearing and granulating the copolymer obtained from step (2), then drying and crushing.

In another aspect, provided herein is the application of the copolymers used as fluid loss additive for drilling fluid in oil drilling. Copolymers provided herein can be used in drilling fluid as high temperature-resisting and salt-resisting fluid loss additive and have good effect of fluid loss control.

BRIEF DESCRIPTION OF THE DRAWINGS

Those of skill in the art will understand that the drawings, described below, are for illustrative purposes only. The drawings are not intended to limit the scope of the present teachings in any way.

DETAILED DESCRIPTION

Figure 1:
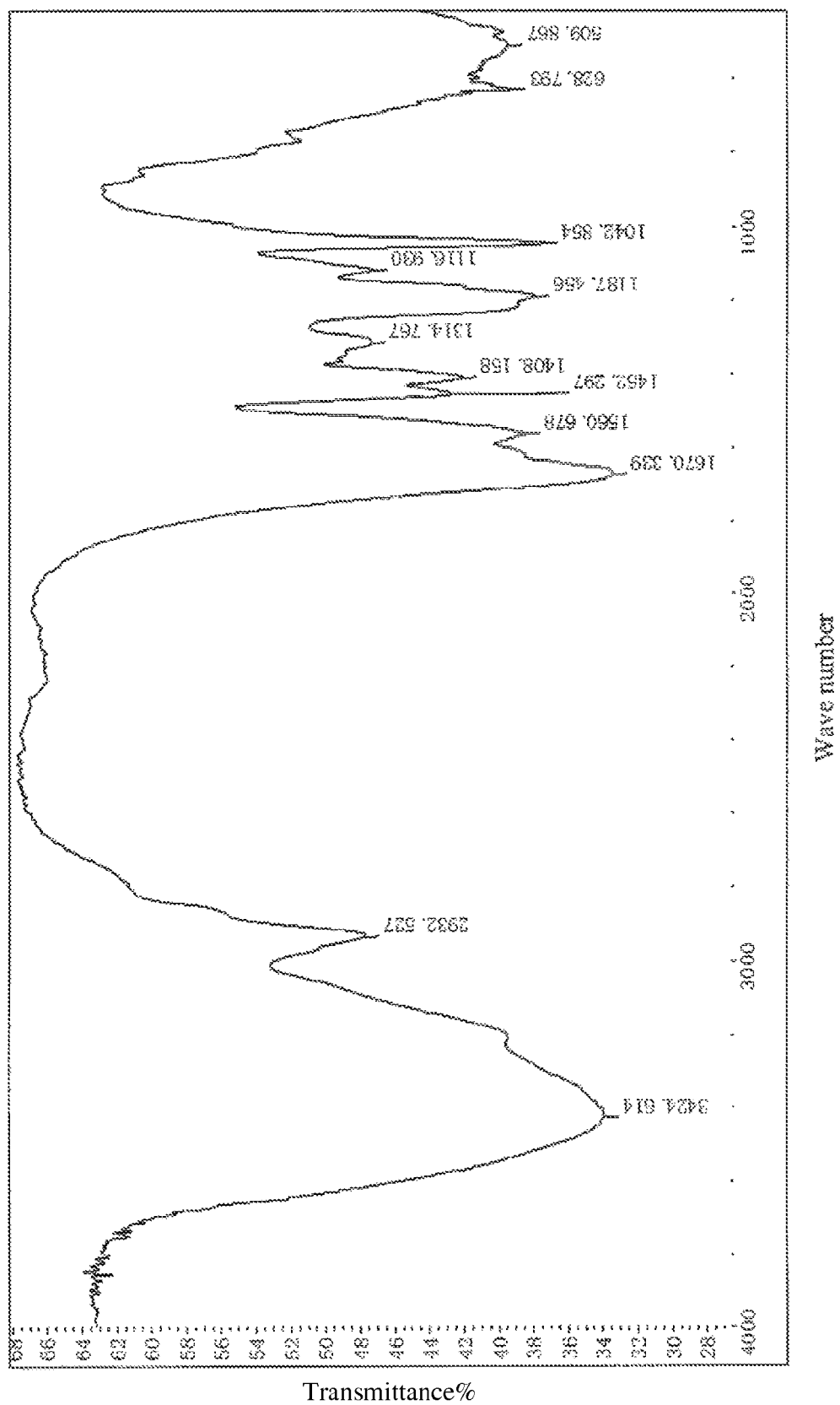
FIG. 1 is the infrared spectra of the high temperature-resisting and high salt-resisting fluid loss additive of general formula No. 1-3 prepared in Example 3.

Provided herein are high temperature-resisting and salt-resisting fluid loss additives for drilling fluid prepared by using different monomers and molecular weight regulators and controlling the molecular weight of the polymers, which comprise several temperature-resisting and salt-resisting fluid loss additives with different structures and different molecular weight range.

In one aspect, the present invention relates to copolymers that function as high temperature-resisting and salt-resisting fluid loss additives for drilling fluid. In some embodiments, the copolymers of present invention are random copolymers comprise the following: (A) acrylamide; (B) acrylic acid B1, or 2-acrylamido-dodecyl sulfonate B2 of the following structure:

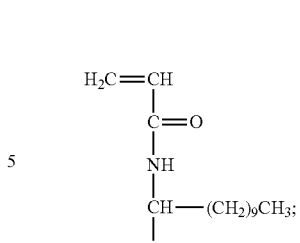

and (C) one of the monomers selected from the following structures: alkenyl sulfonate C1:

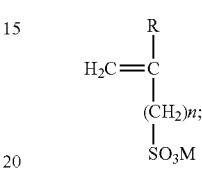

alkyl sulfonate C2 containing acryloxy groups:

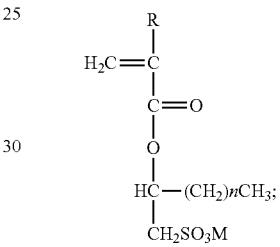

p-styrene sulfonate C3:

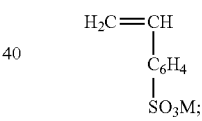

or isoprene sulfonate C4:

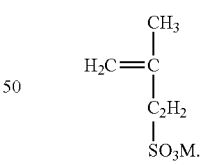

M is $Na^+$ or $K^+$; R is H or $CH_3$; n=0, 1 or 2; and the mole ratio of (A), (B) and (C) is in the range of (1-50):1:(0.5-60).

In some embodiments, the relative molecular weight of the copolymer is from 100,000 to 700,000. In some embodiments, the monomer B of the copolymer is preferably monomers of B2.

In some embodiments, R is H and n=0 for monomers C1, preferably not at the same time.

In some embodiments, monomer C1 is at least one selected from sodium or potassium vinylsulfonate, sodium or potassium allylsulfonate, sodium or potassium methylallyl sulfonate.

In some embodiments, a copolymer of the present invention is preferably represented by one of the following general formulas, including general formula 1 (A+B1+C2) such as:

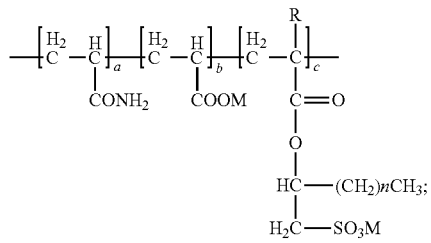

general formula 2 (A+B1+C1) or (A+B1+C3) or (A+B1+C4) such as:

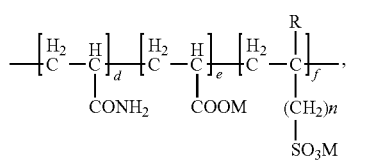

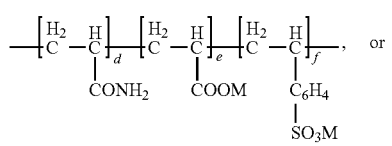

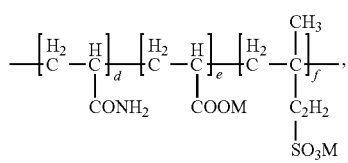

respectively; or general formula 3 (A+B2+C1) or (A+B2+C3) or (A+B2+C4) such as:

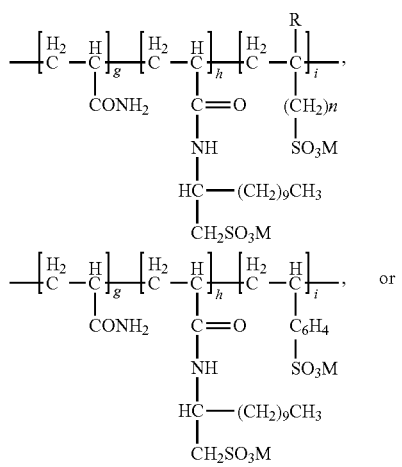

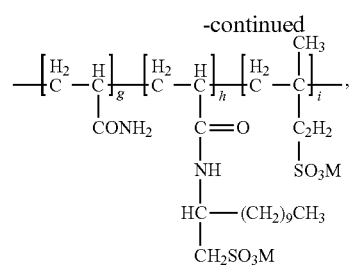

respectively.

In some embodiments, when the copolymer is of general formula 1 (A+B1+C2), the conditions of R being $CH_3$ and n=0 do not occur simultaneously among monomers C2; and the ratio of (a:b:c) is in the range of (2-8):1:(0.5-5.0), and the relative molecular weight thereof is from 500,000 to 700,000, where a represents the quantity of monomer A, b represents the quantity of monomer B1 and c represents the quantity of monomer C2.

In some embodiments, when the copolymer is of general formula 2a: (A+B1+C1), 2b: (A+B1+C3), or 2c: (A+B1+C4), the ratio of (d:e:J) is in the range of (2-8):1:(1-8), and the relative molecular weight thereof is from 300,000 to 500,000, where d represents the quantity of monomer A, e represents the quantity of monomer B1, and f represents the quantity of monomer C1, C3 or C4, respectively.

In some embodiments, when the copolymer is of general formula 3a: (A+B2+C1), 3b: (A+B2+C3), or 3c: (A+B2+C4), the ratio of (g:h:i) is in the range of (10-50):1:(5-60), and the relative molecular weight thereof is from 100,000 to 300,000, where g represents the quantity of monomer A, h represents the quantity of monomer B2, and i represents the quantity of monomer C1, C3 or C4, respectively.

In another aspect, the present invention provides a method of preparing the copolymer, comprising the steps of: (1) adding the said monomer component and molecular weight regulator into a reactor containing water, and adding alkaline substances into the monomers aqueous solution to adjust the pH of the polymerization system to alkaline conditions; (2) adding initiators into the polymerization system to initiate the polymerization reaction; (3) shearing and granulating the copolymer obtained from step (2), then drying and crushing.

In some embodiments, the molecular weight regulator used in the copolymerization reaction for the copolymer is $C_3$-$C_{12}$ mercapto compounds or $C_3$-$C_{12}$ alcohols compounds, which is in an amount of 0.1-2.0 wt % based on the amount of monomers thereof respectively.

In some embodiments, the initiator used in the copolymerization reaction for the copolymer is oxidation-reduction initiator, which is in an amount of (0.1-3.0) wt % based on the amount of the monomers thereof respectively, wherein the weight ratio of the oxidant to the reductant is in the range of (0.5-3):1.

In some embodiments, the oxidant in the initiator is at least one selected from potassium persulfate, ammonium persulfate and hydrogen peroxide; the reductant in the said initiator is at least one selected from sodium hydrogen sulfite, sodium sulfite, sodium thiosulphate, tetramethylethylenediamine, ferrous chloride and cuprous chloride.

In some embodiments, the molecular weight regulator used in the copolymerization reaction for the copolymer of general formula 1 (A+B1+C2) or of general formula 2a: (A+B1+C1), 2b: (A+B1+C3), or 2c: (A+B1+C4) is $C_3$-$C_{12}$ mercapto compound, which is in an amount of (0.1-1.0) wt % based on the total amount of the monomers thereof respectively.

In some embodiments, the molecular weight regulator used in the copolymerization reaction for the copolymer of general formula 3a: (A+B2+C1), 3b: (A+B2+C3), or 3c: (A+B2+C4) is $C_3$-$C_{12}$ alcohol compound, which is in an amount of (0.2-1.0) wt % based on the total amount of the monomers thereof respectively.

In some embodiments, the initiator used in the copolymerization for the copolymer of general formula 1 (A+B1+C2) is in an amount of (0.4-3.0) wt % based on the amount of the monomers thereof, wherein the weight ratio of said oxidant to reductant is in the range of (0.5-2.0):1.

In some embodiments, the initiator used in the copolymerization for the copolymer of general formula 2a: (A+B1+C1), 2b: (A+B1+C3), or 2c: (A+B1+C4) is in an amount of (0.4-3.0) wt % based on the amount of monomers thereof respectively, wherein the weight ratio of the oxidant to the reductant is in the range of (0.5-3.0):1.

In some embodiments, the initiator used in the copolymerization for the copolymer of general formula 3a: (A+B2+C1), 3b: (A+B2+C3), or 3c: (A+B2+C4) is in an amount of (1.0-3.0) wt % based on the amount of monomers thereof respectively, wherein the weight ratio of the oxidant to the reductant is in the range of (0.5-2.0):1.

In some embodiments, when the copolymer of said general formula 1 (A+B1+C2) is polymerized, the weight ratio of the monomers added is within the following range: (acrylic acid:acrylamide:alkyl sulfonate containing acryloxy group)=1:(2-8):(2-10), respectively; preferably 1:(3-6):(4-8), respectively.

In some embodiments, when the copolymer of said general formula 2a: (A+B1+C1), 2b: (A+B1+C3), or 2c: (A+B1+C4) is polymerized, the weight ratio of the monomers added is within the following range: (acrylic acid:acrylamide:alkenyl sulfonate C1 or p-styrene sulfonate C3 or isoprene sulfonate C4)=1:(2-8):(3-12), respectively; preferably 1:(3-6):(4-10), respectively.

In some embodiments, when the copolymer of said general formula 3a: (A+B2+C1), 3b: (A+B2+C3), or 3c: (A+B2+C4) is polymerized, the weight ratio of the monomers added is within the following range: (2-acrylamido-dodecyl sulfonate: acrylamide:alkenyl sulfonate C1 or p-styrene sulfonate C3 or isoprene sulfonate C4)=1:(2-10):(3-25), respectively; preferably 1:(4-9):(5-22), respectively.

In some embodiments, the starting temperature of the polymerization reaction of said polymer is between (20-70)° C., and the reaction temperature is between (50-95)° C. In some embodiments, the pH of the polymerization system of the said copolymer of general formula 1 (A+B1+C2) is between 9.0-11.0. In some embodiments, the pH of the polymerization system of the said copolymer of general formula 2a: (A+B1+C1) or 2b: (A+B1+C3) or 2c: (A+B1+C4) is between 8.5-10.0; the pH of the polymerization system of the said copolymer of general formula 3a: (A+B2+C1) or 3b: (A+B2+C3) or 3c: (A+B2+C4) is between 8.5-11.0. In some embodiments, the polymerization reaction time of the said copolymer of general formula 1 (A+B1+C2) is between (10-25) minutes. In some embodiments, the polymerization reaction time of the said copolymer of general formula 2a: (A+B1+C1) or 2b: (A+B1+C3) or 2c: (A+B1+C4) is between (8-28) minutes. In some embodiments, the polymerization reaction time of the said copolymer of general formula 3a: (A+B2+C1) or 3b: (A+B2+C3) or 3c: (A+B2+C4)) is between (2-10) minutes.

In another aspect, provided herein is the application of the copolymers used as fluid loss additive for drilling fluid in oil drilling. Copolymers provided herein can be used in drilling fluid as high temperature-resisting and salt-resisting fluid loss additive and have good effect of fluid loss control.

In some embodiments, the copolymer of the present invention is generally added into drilling mud (slurry) commonly used in oil drilling application acting as fluid loss additive when the stratums being drilled are at high temperature or at high salt concentration. In the application of the present invention, the content of the copolymer in the drilling slurry is in the range of (0.005-0.07) g/ml.

In some embodiments, when used as fluid loss additives in drilling fluid, the copolymers of present invention do not make the drilling fluid thicken at high temperature of 200° C. and high salt conditions of saturated brine, and have good fluid loss properties, whose medium-pressure fluid loss after aging and rolling for 16 h at high temperature of 200° C. is less than 8 ml which is measured in accordance with the American Petroleum Institute Standard Test at room temperature, and have good properties of high temperature-resisting and salt-resisting.

DETAILED DESCRIPTION OF ADDITIONAL EMBODIMENTS

In some embodiments, the infrared spectra of the fluid loss additives are measured using IR200 infrared spectrometer, from Thermo Company, U.S., using KBr tablet.

Measurement of the relative molecular weight is achieved by: using Ubbelohde viscometer (1.0 mol/L $NaNO_3$ aqueous solution as the solvent), (30±0.1)° C., by the method of gradual dilution to measure the intrinsic viscosity [77] of the polymer, and using the following formula to calculate the viscosity average molecular weight of the copolymers.

$$\eta_r = t\text{solution}/t\text{solvent}$$

$$\eta_{sp} = \eta_r - 1$$

$$\eta = [2(\eta_{sp} - \ln \eta_r)]^{1/2}/C \text{ and } M_\eta = 802(100\eta)^{1.25}$$

where tsolution refers to the retention time of the sample solution, s; tsolvent refers to the retention time of the $NaNO_3$ aqueous solution, s; $\eta_r$ denotes relative viscosity; $\eta$ denotes intrinsic viscosity, dL/g; $\eta_{sp}$ denotes specific viscosity; $M_\eta$ denotes the viscosity average molecular weight; and C denotes concentration of the sample solution, g/dL.

EXAMPLES

Example 1

Water was added into a reaction flask, and 50 g of water soluble monomer acrylamide (0.70 mol), 10 g of acrylic acid (0.14 mol), 70 g of potassium (2-acryloxy) butyl sulfonate (0.28 mol) and 0.7 g of molecular weight regulator tert-dodecyl mercaptan were dissolved in the water uniformly under stirring, then the pH of the polymerization system was adjusted to 9.5 with 40% of KOH aqueous solution. An aqueous solution of initiator (1.0 g of $K_2S_2O_8$ and 1.0 g of $Na_2SO_3$ dissolving in 5 ml of water respectively) was added to initiate the reaction at 34° C. The polymerization reaction was completed after 22 minutes, and an elastic gel was obtained. After granulated, dried and crushed, a high temperature-resisting and high salt-resisting fluid loss additive of general formula No. 1-1 (FLA No. 1-1) was obtained, with relative molecular weight of 680,000.

Example 2

Water was added into a reaction flask, and 50 g of water soluble monomer acrylamide (0.70 mol), 15 g of acrylic acid (0.21 mol), 100 g of sodium (2-acryloxy) butyl sulfonate (0.43 mol) and 0.5 g of molecular weight regulator tert-dodecyl mercaptan were dissolved in the water uniformly under stirring, then the pH of the polymerization system was adjusted to 10.5 with 40% of NaOH aqueous solution. An aqueous solution of initiator (1.0 g of $K_2S_2O_8$ and 1.0 g of $Na_2SO_3$ dissolving in 5 ml of water respectively) was added to initiate the reaction at 36° C. The polymerization reaction was completed after 14 min, and an elastic gel was obtained. After granulated, dried and crushed, the high temperature and high salt resisting fluid loss additive of general formula No. 1-2 (FLA No. 1-2) was obtained, with relative molecular weight of 570,000.

Example 3

Water was added into a reaction flask, and 50 g of water soluble monomer acrylamide (0.70 mol), 10 g of acrylic acid (0.14 mol), 70 g of sodium (2-methoxyacryloxy) butyl sulfonate (0.28 mol) and 0.5 g of molecular weight regulator tert-dodecyl mercaptan were dissolved in the water uniformly under stirring, then the pH of the polymerization system was adjusted to 9.5 with 40% of NaOH aqueous solution. An aqueous solution of initiator (1.0 g of $K_2S_2O_8$ and 1.0 g of $Na_2SO_3$ dissolving in 5 ml of water respectively) was added to initiate the reaction at 35° C. The polymerization reaction was completed after 17 min, and an elastic gel was obtained. After granulated, dried and crushed, the high temperature and high salt resisting fluid loss additive of general formula No. 1-3 (FLA No. 1-3) was obtained, with relative molecular weight of 630,000.

FIG. 1 is the infrared spectra of the high temperature and high salt resisting fluid loss additive of general formula No. 1-3 (FLA No. 1-3) prepared in example 3.

In FIG. 1, peaks at 3424.6 $cm^{-1}$ are stretching vibration absorption peaks of N—H bonds in the amide (—CONH—); peaks at 2962.5 $cm^{-1}$ are stretching vibration absorption peaks of —$CH_2$; peaks at 1670.3 $cm^{-1}$ are stretching vibration absorption peaks of —C=O; peaks at 1452.3 $cm^{-1}$ are deformation vibration absorption peaks of —NH; peaks at 1187.5 $cm^{-1}$ and peaks at 1042.9 $cm^{-1}$ are stretching vibration absorption peaks of —$SO_3$, proving with low intensity that there are amide groups, sulfonic groups and acryloxy groups in the synthesized polymer.

Example 4

Water was added into a reaction flask, and 50 g of water soluble monomer acrylamide (0.70 mol), 10 g of acrylic acid (0.14 mol), 70 g of potassium (2-acryloxy) amyl sulfonate (0.27 mol) and 0.4 g of molecular weight regulator tert-dodecyl mercaptan were dissolved in the water uniformly under stirring, then the pH of the polymerization system was adjusted to 9.5 with 40% of KOH aqueous solution. An aqueous solution of initiator (1.0 g of $K_2S_2O_8$ and 1.0 g of $Na_2SO_3$ dissolving in 5 ml of water respectively) was added to initiate the reaction at 50° C. The rapid polymerization reaction was completed after 12 min, and an elastic gel was obtained. After granulated, dried and crushed, high temperature and high salt resisting fluid loss additive of general formula No. 1-4 (FLA No. 1-4) was obtained, with relative molecular weight of 530,000.

Example 5

Evaluation of Resistance to Temperature and Fluid Loss Effect

Reference standard of the test methods: (1) Drilling test procedures in Oil and Gas Industry Standard SY/T 5621-93 of People's Republic of China; (2) General technical conditions for synthetic polymer used in drilling fluid in Enterprise Standard Q/ZY 0811-2002 of Sinopec Zhongyuan Petroleum Exploration Bureau of China.

1. The Fluid Loss Effect in Saturated Brine-Based Slurry

Preparation of 2% of saturated brine-based slurry: 350 ml of water was added into a high-speed mixing cup, then 0.42 g of $Na_2CO_3$, 7 g of sodium bentonite for experiment, 10.5 g of sulfonated lignite and 105 g of NaCl were added under high-speed stirring; after stirring for 20 min, the mixture was placed in seal for 24 h.

Preparation of 4% of saturated brine-based slurry: 350 ml of water was added into a high-speed mixing cup, then 0.84 g of $Na_2CO_3$, 14 g of sodium bentonite for experiment, 10.5 g of sulfonated lignite and 105 g of NaCl were added under high-speed stirring; after stirring for 20 min, the mixture was placed in seal for 24 h.

Preparation of 6% of saturated brine-based slurry: 350 ml of water was added into a high-speed mixing cup, then 1.26 g of $Na_2CO_3$, 21 g of sodium bentonite for experiment, 10.5 g of sulfonated lignite and 105 g of NaCl were added under high-speed stirring, after stirring for 20 min, placed in seal for 24 h.

Preparation of the experimental slurry: the high temperature and high salt resisting fluid loss additive of general formula No. 1-3 (FLA No. 1-3) prepared in example 3 was added into 2% of saturated brine-based slurry, to prepare experimental slurries with the concentrations of the FLA No. 1-3 of being 0.01 g/ml, 0.02 g/ml and 0.03 g/ml respectively. The rheological properties (apparent viscosity AV, plastic viscosity PV and yield point YP), the medium pressure fluid loss $FL_{API}$ (API is the medium pressure fluid loss according to the American Petroleum Institute Standard Test at room temperature) and high-temperature and high pressure fluid loss $FL_{HTHP}$ were measured after rolling and aging for 16 h at 200° C. Operate according to the said test standards, and the results are shown in table 1.

TABLE 1

Effects of FLA No. 1-3 with different concentrations on the properties of the drilling fluid system

| Formulation | AV/ mPa·s | PV/ mPa·s | YP/ Pa | $FL_{API}$/ ml | $FL_{HTHP}$/ ml (180° C.) |
|---|---|---|---|---|---|
| 2% of saturated brine-based slurry | 4.3 | 3.5 | 0.8 | 132 | 232 |
| 350 ml of 2% saturated brine-based slurry + 3.5 g of FLA No. 1-3 | 11 | 9.5 | 1.5 | 5.8 | 34 |
| 350 ml of 2% saturated brine-based slurry + 7.0 g of FLA No. 1-3 | 19 | 21.5 | 2.5 | 3.1 | 22 |
| 350 ml of 2% saturated brine-based slurry + 10.5 g of FLA No. 1-3 | 32 | 28 | 4 | 2.6 | 17 |

2. The Effects of Fluid Loss at Different Aging Temperature

The 2% of saturated brine-based experimental slurry containing the high temperature and high salt resisting fluid loss additive of general formula No. 1-3 (FLA No. 1-3) with the concentration of 0.03 g/ml was prepared according to the method above. The rheological properties (apparent viscosity AV, plastic viscosity PV and yield point YP), the medium pressure fluid loss $FL_{API}$ and high-temperature and high pressure fluid loss $FL_{HTHP}$ were measured after rolling and aging for 16 h at room temperature, 200° C., 220° C. and 240° C. respectively. Operate according to the said test standards, and the results are shown in table 2.

TABLE 2

Effects of the aging temperature on the properties of 2% saturated brine-based experimental slurry containing FLA No. 1-3 with the concentration of 0.03 g/ml

| Aging conditions | AV/ mPa·s | PV/ mPa·s | YP/ Pa | $FL_{API}$/ ml | $FL_{HTHP}$/ ml |
|---|---|---|---|---|---|
| 200° C./16 h | 32 | 28 | 4 | 2.6 | 17 (180° C.) |
| 220° C./16 h | 30 | 26 | 4 | 3.2 | 20.5 (180° C.) |
| 240° C./16 h | 26 | 23 | 3 | 4.7 | 31 (200° C.) |

3. Contrast of Effects with Commodity Having the Same Properties

The high temperature and high salt resisting fluid loss additives of number 1 to 4 of general formula 1 prepared in the examples were compared with temperature resisting fluid loss additive Driscal D from Drilling Specialties Company. The base slurry and experimental slurry were prepared according to the methods above, and the rheological properties and water loss were measured after rolling and aging for 16 h at 200° C. Operate according to the said test standards, and the results are shown in table 3.

TABLE 3

Comparison of the effects of the high temperature and high salt resisting fluid loss additives of number 1 to 4 of general formula 1 with fluid loss additive Driscal D

| Formulation | AV/ mPa·s | PV/ mPa·s | YP/ Pa | $FL_{API}$/ ml | $FL_{HTHP}$/ ml (180° C.) |
|---|---|---|---|---|---|
| 350 ml of 2% saturated brine-based slurry + 10.5 g of FLA No. 1-1 | 33 | 29.5 | 4.5 | 2.8 | 16 |
| 350 ml of 2% saturated brine-based slurry + 10.5 g of FLA No. 1-2 | 29 | 26 | 3 | 3.3 | 17 |
| 350 ml of 2% saturated brine-based slurry + 10.5 g of FLA No. 1-3 | 32 | 28 | 4 | 2.6 | 17 |
| 350 ml of 2% saturated brine-based slurry + 10.5 g of FLA No. 1-4 | 27 | 24 | 3 | 2.9 | 19 |
| 350 ml of 2% saturated brine-based slurry + 10.5 g of Discal D | 39 | 33 | 6 | 5.2 | 37.4 |

After the fluid loss additive was added into the 2% saturated brine based slurry, the more the API fluid loss and HTHP fluid loss measured was reduced, the better the effect of the fluid loss additives. The results of table 1-3 indicated that, the high temperature and high salt resisting fluid loss additives of general formula 1 of the present invention had excellent fluid loss effect after aging and rolling for 16 h at 200° C.-240° C. in the saturated sodium chloride aqueous slurry, and had low thickening effect and excellent fluid loss effect, compared with similar imported products.

Example 6

Water was added into a reaction flask, and 50 g of water soluble monomer acrylamide (0.70 mol), 15 g of acrylic acid (0.21 mol), 70 g of sodium methylallyl sulfonate (0.44 mol) were dissolved in the water uniformly under stirring; 0.5 g of molecular weight regulator tert-dodecyl mercaptan was added, and the pH of the polymerization system was adjusted to 9.0 with 40% of NaOH aqueous solution. An aqueous solution of initiator (1.5 g of $K_2S_2O_8$ and 1.5 g of $Na_2SO_3$ dissolving in 5 ml of water respectively) was added to initiate the reaction at 45° C.; the polymerization reaction was completed after 25 min, and an elastic gel was obtained. After granulated, dried and crushed, the high temperature and high salt resisting fluid loss additive of general formula No. 2-1 (FLA No. 2-1) was obtained, with relative molecular weight of 450,000.

Example 7

Water was added into a reaction flask, and 50 g of water soluble monomer acrylamide (0.70 mol), 10 g of acrylic acid (0.14 mol), 100 g of sodium isoprene sulfonate (0.59 mol) were dissolved in the water uniformly under stirring; 0.5 g of molecular weight regulator tert-dodecyl mercaptan was added, and the pH of the polymerization system was adjusted to 9.0 with 40% of NaOH aqueous solution. An aqueous solution of initiator (2.0 g of $H_2O_2$ and 1.0 g of $NaHSO_3$ dissolving in 5 ml of water respectively) was added to initiate the reaction at 47° C.; the polymerization reaction was completed after 15 min, and an elastic gel was obtained. After granulated, dried and crushed, high temperature and high salt resisting fluid loss additive of general formula No. 2-2 (FLA No. 2-2) was obtained, with relative molecular weight of 410,000.

Figure 2:
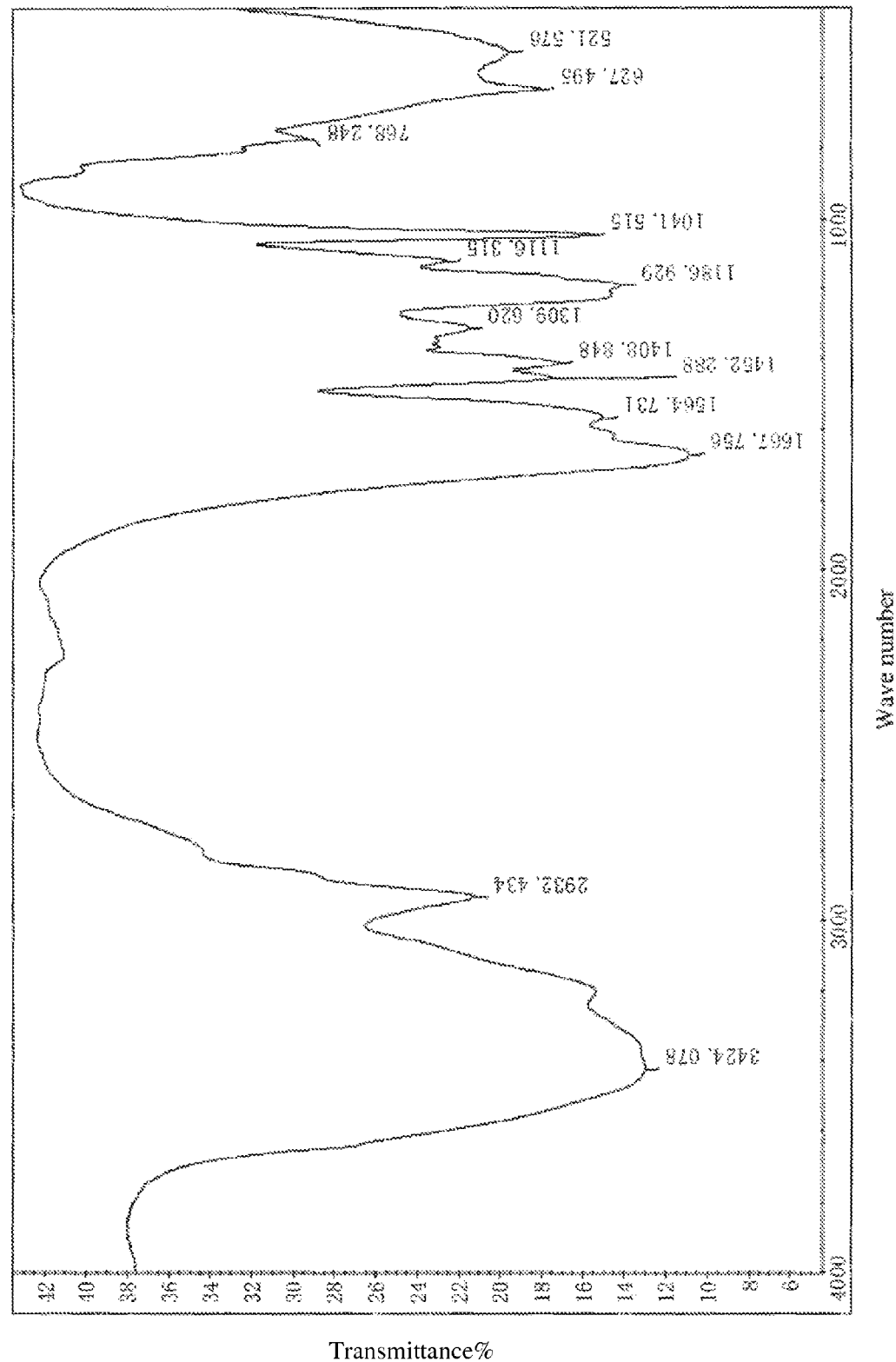
FIG. 2 is the infrared spectra of the high temperature-resisting and high salt-resisting fluid loss additive of general formula No. 2-2 prepared in Example 7.

FIG. 2 is the infrared spectra of the high temperature and high salt resisting fluid loss additive of general formula No. 2-2 (FLA No. 2-2) prepared in example 7.

In FIG. 2, peak at 3424.1 $cm^{-1}$ is the stretching vibration absorption peak of N—H bond in the amide (—CONH—); peak at 2932.4 $cm^{-1}$ is stretching vibration absorption peak of —$CH_2$; peak at 1667.8 $cm^{-1}$ is stretching vibration absorption peak of —C=0; peak at 1452.3 $cm^{-1}$ is deformation vibration absorption peak of —NH; peaks at 1186.9 $cm^{-1}$ and 1041.5 $cm^{-1}$ are stretching vibration absorption peaks of —$SO_3$, proving with low intensity that there are amide groups, sulfonic groups and acryloxy groups in the polymer.

Example 8

Water was added into a reaction flask, and 40 g of water soluble monomer acrylamide (0.56 mol), 10 g of acrylic acid (0.14 mol), 70 g of sodium p-styrene sulfonate (0.34 mol) were dissolved in the water uniformly under stirring; 0.5 g of molecular weight regulator tert-dodecyl mercaptan was added, and the pH of the polymerization system was adjusted to 9.0 with 40% of KOH aqueous solution. The aqueous solution of initiator (1.5 g of $(NH_4)_2S_2O_8$ and 1.5 g of tetramethylethylenediamine dissolving in 5 ml of water respectively) was added to initiate the reaction at 47° C.; the polymerization reaction was completed after 12 min, and an elastic gel was obtained. After granulated, dried and crushed, the high temperature and high salt resisting fluid loss additive of general formula No. 2-3 (FLA No. 2-3) was obtained, with relative molecular weight of 400,000.

Example 9

Water was added into a reaction flask, and 40 g of water soluble monomer acrylamide (0.56 mol), 10 g of acrylic acid (0.14 mol), 70 g of sodium p-styrene sulfonate (0.34 mol)

were dissolved in the water uniformly under stirring; 0.5 g of molecular weight regulator tert-dodecyl mercaptan was added, and the pH of the polymerization system was adjusted to 9.0 with 40% of KOH aqueous solution. The aqueous solution of initiator (1.5 g of $(NH_4)_2S_2O_8$ and 1.5 g of tetramethylethylenediamine dissolving in 5 ml of water respectively) was added to initiate the reaction at 50° C.; the polymerization reaction was completed after 10 min, and an elastic gel was obtained. After granulated, dried and crushed, the high temperature and high salt resisting fluid loss additive of general formula No. 2-4 (FLA No. 2-4) was obtained, with relative molecular weight of 340,000.

Example 10

Evaluation of Fluid Loss Effect

The high temperature and high salt-resisting fluid loss additives of number 1 to 4 of general formula 2 were added into the 2% saturated brine-based slurry prepared, then the mixture was added into a high-temperature aging tank after high-speed stirring for 20 min. The rheological properties (apparent viscosity AV, plastic viscosity PV and yield point YP) and fluid loss (medium pressure fluid loss $FL_{API}$ and high-temperature and high pressure fluid loss $FL_{HTHP}$) were measured at room temperature after rolling for 16 h at 200° C. Operate according to the said test standards, and the results are shown in table 4.

TABLE 4

Results of the fluid loss properties of high temperature and high salt resisting fluid loss additives of number 1 to 4 of general formula 2 (200° C./16 h).

| Formulation | AV/ mPa·s | PV/ mPa·s | YP/ Pa | $FL_{API}$/ ml | $FL_{HTHP}$/ ml (180° C.) |
|---|---|---|---|---|---|
| 2% of saturated brine-based slurry | 4.5 | 3.5 | 1 | 132 | 282 |
| 350 ml of 2% saturated brine-based slurry + 14 g of FLA No. 2-1 | 23 | 20 | 3 | 3.6 | 25 |
| 350 ml of 2% saturated brine-based slurry + 14 g of FLA No. 2-2 | 21.5 | 19 | 2.5 | 2.0 | 26.6 |
| 350 ml of 2% saturated brine-based slurry + 14 g of FLA No. 2-3 | 21 | 18.5 | 2.5 | 4 | 28 |
| 350 ml of 2% saturated brine-based slurry + 14 g of FLA No. 2-4 | 19.5 | 17.5 | 2 | 3.5 | 29 |

Preparation of the second experimental slurry: 14 g of the high temperature and high salt resisting fluid loss additive of general formula No. 2-2 (FLA No. 2-2) was added into 350 ml of the 4% and 6% saturated brine-based slurry prepared respectively, then the mixtures were added into a high-temperature aging tank after high-speed stirring uniformly. The rheological properties were measured at room temperature after rolling for 16 h at 200° C. and 220° C. respectively. Operate according to the said test standards, and the results are shown in table 5.

TABLE 5

Results of the fluid loss properties of FLA No. 2-2

| Formulation | Aging condition | AV mPa·s | PV/ mPa·s | YP/ Pa | $FL_{API}$/ ml | $FL_{HTHP}$/ ml (180° C.) |
|---|---|---|---|---|---|---|
| 4% of saturated brine-based slurry | 200° C./16 h | 5 | 4 | 1 | 190 | 218 |
| 350 ml of 4% saturated brine-based slurry + 14 g of FLA No. 2-2 | | 20 | 12 | 8 | 10.4 | 29.8 |
| 350 ml of 4% saturated brine-based slurry + 14 g of FLA No. 2-2 | 220° C./16 h | 22 | 13 | 9 | 8.4 | 27 |
| 6% of saturated brine-based slurry | | 7 | 5 | 2 | 201 | 216 |
| 350 ml of 6% saturated brine-based slurry + 14 g of FLA No. 2-2 | | 37.5 | 14 | 13.5 | 8.2 | 35.8 |

It can be seen from the data in table 4 and 5 that the high temperature and high salt resisting fluid loss additives of the present invention had excellent properties of fluid loss control in the experimental 4% of sodium bentonite saturated brine-based slurry; after added into the experimental 4% and 6% of sodium bentonite saturated brine-based slurry, and after aging for 16 h at high temperature of 200° C. and 220° C., the high temperature and high salt resisting fluid loss additive of general formula No. 2-2 had little medium-pressure fluid loss and can control the high temperature and pressure water loss well, indicating that the fluid loss additives have excellent fluid loss effects at high temperature and high salt conditions.

Example 11

Water was added into a reaction flask, and 50 g of water soluble monomer acrylamide (0.70 mol), 10 g of 2-acrylamido-dodecane sulfonic acid (0.03 mol), 80 g of sodium methylallyl sulfonate (0.51 mol) were dissolved in the water uniformly under stirring, then 0.5 g of molecular weight regulator isopropanol was added, and the pH of the polymerization system was adjusted to 9.0 with 40% of NaOH aqueous solution. The aqueous solution of the initiator (1.2 g of $(NH_4)_2S_2O_8$ and 1.2 g of $Na_2SO_3$ dissolving in 5 ml of water respectively) was added to initiate the reaction at 60° C.; the polymerization reaction was completed after 7 min, and an elastic gel was obtained. After granulated, dried and crushed, the high temperature and high salt resisting fluid loss additive of general formula No. 3-1 (FLA No. 3-1) was obtained, with relative molecular weight of 273,000.

Example 12

Water was added into a reaction flask, and 40 g of water soluble monomer acrylamide (0.56 mol), 5 g of 2-acrylamido-dodecane sulfonic acid (0.016 mol), 100 g of potassium isoprene sulfonate (0.53 mol) were dissolved in the water uniformly under stirring, then 0.5 g of molecular weight regulator isopropanol was added, and the pH of the polymerization system was adjusted to 10.5 with 40% of KOH aqueous solution. The aqueous solution of the initiator (1.5 g of $H_2O_2$ and 1.0 g of $NaHSO_3$ dissolving in 5 ml of water respectively) was added to initiate the reaction at 63° C.; the polymerization reaction was completed after 5 min, and an elastic gel was obtained. After granulated, dried and crushed, the high temperature and high salt resisting fluid loss additive of general formula No. 3-2 (FLA No. 3-2) was obtained, with relative molecular weight of 218,000.

Figure 3:
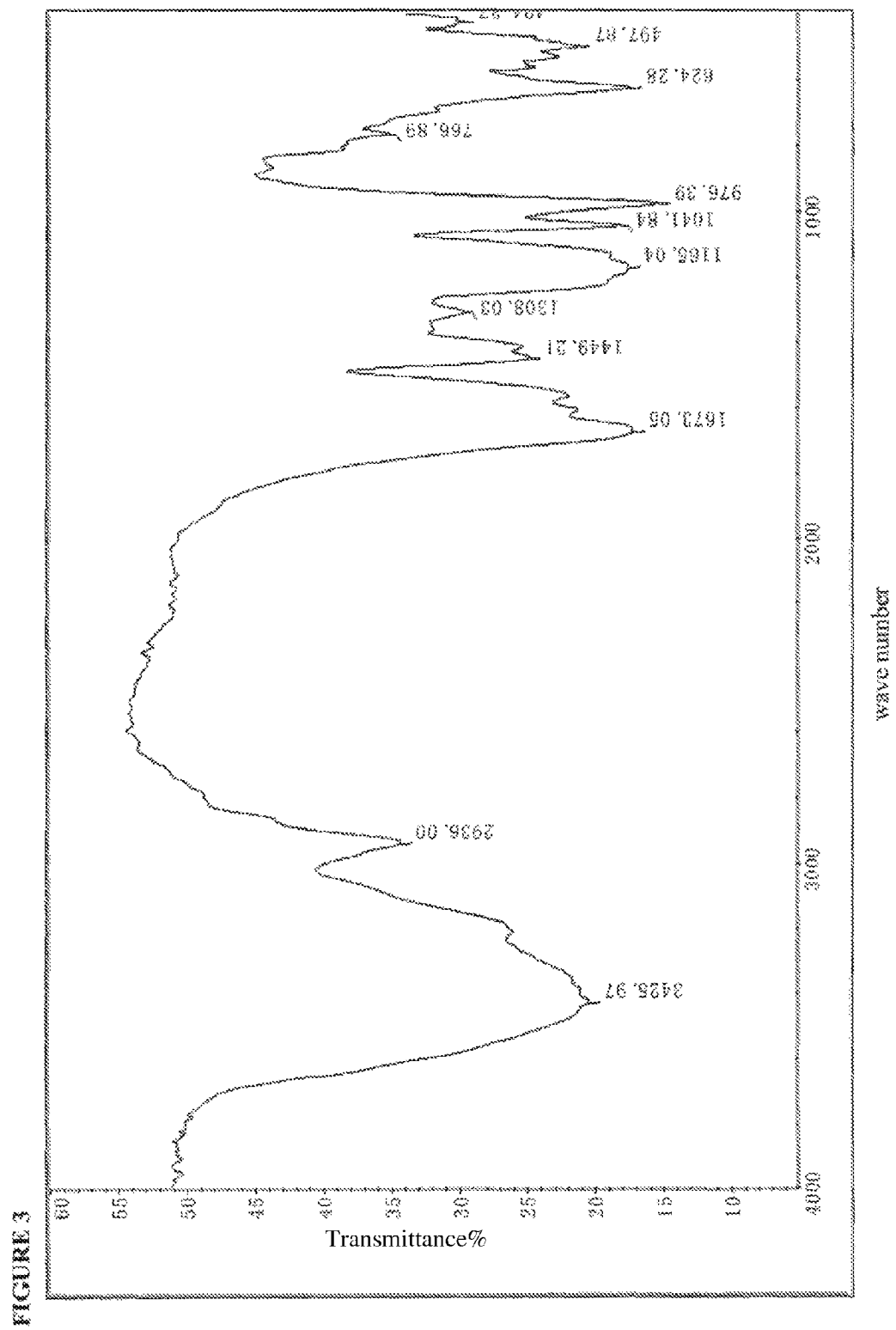
FIG. 3 is the infrared spectra of the high temperature-resisting and high salt-resisting fluid loss additive of general formula No. 3-2 prepared in Example 12.

FIG. 3 is the infrared spectra of the high temperature and high salt resisting fluid loss additive of general formula No. 3-2 (FLA No. 3-2) prepared in example 12.

In FIG. 3, peak at 3426.0 cm$^{-1}$ is the stretching vibration absorption peak of N—H bond in the amide (—CONH—); peak at 2936.0 cm$^{-1}$ is stretching vibration absorption peak of —CH$_2$; peak at 1673.0 cm$^{-1}$ is stretching vibration absorption peak of —C=O; peak at 1449.2 cm$^{-1}$ is deformation vibration absorption peak of —NH; peaks at 1165.0 cm$^{-1}$ and 1041.8 cm$^{-1}$ are stretching vibration absorption peaks of —SO$_3$, proving with little intensity that there are amide groups, sulfonic groups and acryloxy groups in the polymer obtained.

Example 13

Water was added into a reaction flask, and 40 g of water soluble monomer acrylamide (0.56 mol), 8 g of 2-acrylamido-dodecane sulfonic acid (0.026 mol), 80 g of potassium isoprene sulfonate (0.43 mol) were dissolved in the water uniformly under stirring, then 0.8 g of molecular weight regulator isopropanol was added, and the pH of the polymerization system was adjusted to 9.5 with 40% of KOH solution. The aqueous solution of the initiator (1.2 g of $(NH_4)_2S_2O_8$ and 1.2 g of tetramethylethylenediamine dissolving in 5 ml of water respectively) was added to initiate the reaction at 58° C. The polymerization reaction was completed after 9 min, and an elastic gel was obtained. After granulated, dried and crushed, the high temperature and high salt resisting fluid loss additive of general formula No. 3-3 (FLA No. 3-3) was obtained, with relative molecular weight of 201,000.

Example 14

Water was added into a reaction flask, and 40 g of water soluble monomer acrylamide (0.56 mol), 8 g of 2-acrylamido-dodecane sulfonic acid (0.026 mol), 80 g of sodium methylallyl sulfonate (0.51 mol) were dissolved in the water uniformly under stirring, then 0.8 g of molecular weight regulator isopropanol was added, and the pH of the polymerization system was adjusted to 10 with 40% of KOH aqueous solution. The aqueous solution of the initiator (1.5 g of $(NH_4)_2S_2O_8$ and 1.5 g of $Na_2SO_3$ dissolving in 5 ml of water respectively) was added to initiate the reaction at 63° C. The polymerization reaction was completed after 6 min, and an elastic gel was obtained. After granulated, dried and crushed, the high temperature and high salt resisting fluid loss additive of general formula No. 3-4 (FLA No. 3-4) was obtained, with relative molecular weight of 146,000.

Example 15

Evaluation of Fluid Loss Effect

Evaluation of the fluid loss effect in saturated brine-based slurry of the fluid loss additive of general formula 3 prepared above was made. Operate according to said test standards, and the results are shown in table 6.

TABLE 6

Results of the fluid loss properties of the high temperature and high salt resisting fluid loss additives of number 1 to 4 of general formula 3 (200° C./16 h)

| Formulation | AV/ mPa·s | PV/ mPa·s | YP/ Pa | FL$_{API}$/ ml | FL$_{HTHP}$/ ml (180° C.) |
|---|---|---|---|---|---|
| 2% of saturated brine-based slurry | 4.5 | 3.5 | 1 | 132 | 282 |
| 350 ml of 2% saturated brine-based slurry + 17.5 g of FLA No. 3-1 | 37 | 33 | 4 | 1.6 | 21.2 |
| 350 ml of 2% saturated brine-based slurry + 17.5 g of FLA No. 3-2 | 35 | 32 | 3 | 1.8 | 22.4 |
| 350 ml of 2% of saturated brine-based slurry + 17.5 g of FLA No. 3-3 | 35 | 31 | 3 | 2.6 | 21.8 |
| 350 ml of 2% saturated brine-based slurry + 17.5 g of FLA No. 3-4 | 32 | 30 | 2 | 1.8 | 26.2 |

It can be seen from the data in the table that the high temperature and high salt resisting fluid loss additives of the general formula No. 3-1 of the present invention in 2% of sodium bentonite saturated brine-based slurry had little medium-pressure water loss after aging for 16 h at high temperature of 200° C., indicating that the fluid loss additives had excellent fluid loss effects at high temperature and high salt conditions.

What is claimed is:
1. A copolymer consisting of:
an A monomer;
a B monomer; and
a C monomer, wherein:
the A monomer is an acrylamide;
the B monomer is an acrylic acid B1 monomer; and
the C monomer is an alkyl sulfonate C2 monomer containing acryloxy group:

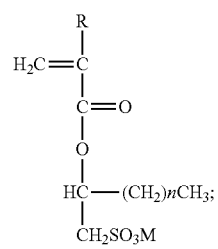

wherein M is $Na^+$ or $K^+$, R is H or $CH_3$, and n=0, 1 or 2, wherein the structure of the copolymer is represented by general formula 1, (A+B1+C2):

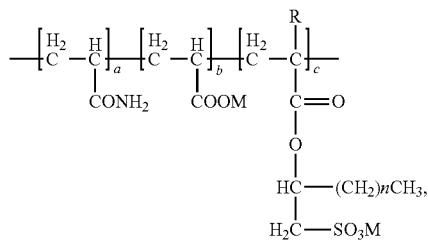

wherein a represents the quantity of the A monomer, b represents the quantity of the B monomer, c represents the quantity of the C2 monomer, and the ratio of (a:b:c) is in the range of (2-8):1:(0.5-5.0),
wherein in C2 monomer R being H and n=0 do not occur simultaneously; and
wherein the relative molecular weight of the copolymer is from 500,000 to 700,000.

2. A copolymer comprising:
an A monomer;
a B monomer; and
a C monomer, wherein:
the A monomer is an acrylamide;
the B monomer is a 2-acrylamido-dodecyl sulfonate B2 monomer of the structure:

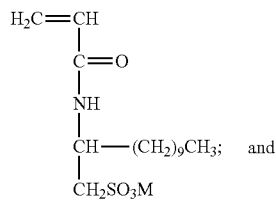

the C monomer is selected from the group consisting of an alkenyl sulfonate C1 monomer:

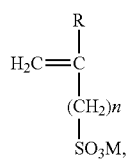

an alkyl sulfonate C2 monomer containing acryloxy group:

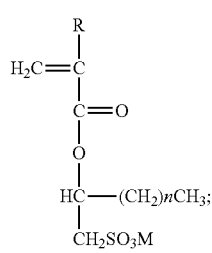

a p-styrene sulfonate C3 monomer:

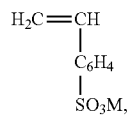

and an isoprene sulfonate C4 monomer:

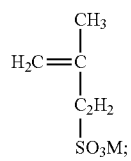

and wherein:
M is $Na^+$ or $K^+$;
R is H or $CH_3$;
n=0, 1 or 2;
the molar ratio of the A monomer, B monomer and C monomer is in the range of (1-50):1:(0.5-60); and
the relative molecular weight of the copolymer is from 100,000 to 700,000.

3. The copolymer of claim 2, wherein the conditions of R being H and n=0 do not occur simultaneously for C1 monomers.

4. The copolymer of claim 2, wherein a C1 monomer is selected from the group consisting of sodium or potassium vinylsulfonate, sodium or potassium allylsulfonate, sodium, and potassium methylallyl sulfonate.

5. The copolymer of claim 2, wherein the copolymer is of general formula 3a (A+B2+C1): 3b (A+B2+C3), or 3c (A+B2+C4),

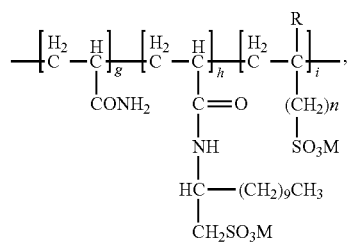

wherein in general formula 3a, g represents the quantity of the A monomer, h represents the quantity of the B2 monomer, i represents the quantity of the C1 monomer,
general formula 3b, (A+B2+C3):

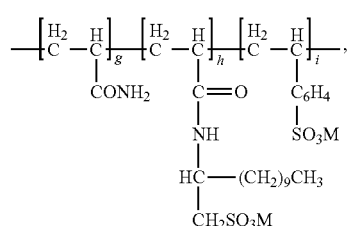

wherein in general formula 3b, g represents the quantity of the A monomer, h represents the quantity of the B2 monomer, i represents the quantity of the C3 monomer, or general formula 3c, (A+B2+C4):

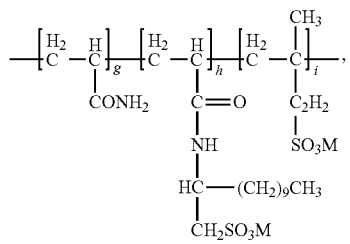

wherein in general formula 3c, g represents the quantity of the A monomer, h represents the quantity of the B2 monomer, i represents the quantity of the C4 monomer,
  wherein the ratio of (g:h:i) is in the range of (10-50):1:(5-60), where g represents the quantity of monomer A, h represents the quantity of monomer B2, and i represents the quantity of monomer C1, C3 or C4, respectively; and wherein the relative molecular weight of the copolymer is from 100,000 to 300,000.

6. A method for preparing a drilling fluid in oil drilling, comprising:
  obtaining a copolymer of claim 2;
  adding the copolymer into a drilling slurry.

7. The method of claim 6, wherein the content of the copolymer in the drilling slurry ranges from 0.005 g/ml to 0.07 g/ml.

8. A method of preparing a copolymer, comprising:
  (1) adding an A monomer, a B monomer, and a C monomer components and a molecular weight regulator into a reactor containing water, thereby rendering a solution of monomers of a polymerization system, and adding an alkaline substances into the solution of monomers to adjust the pH of the polymerization system to alkaline conditions;
  (2) adding an initiator into the solution of monomers to initiate a polymerization reaction to obtain the copolymer;
  (3) shearing and granulating the copolymer obtained from step (2), then drying and crushing the copolymer;
  wherein:
  the A monomer is an acrylamide;
  the B monomer is an acrylic acid B1 monomer, or a 2-acrylamido-dodecyl sulfonate B2 monomer of the structure:

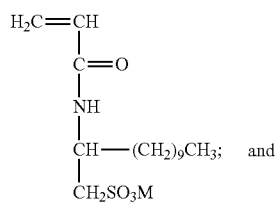

the C monomer is selected from the group consisting of an alkenyl sulfonate C1 monomer:

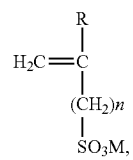

an alkyl sulfonate C2 monomer containing acryloxy group:

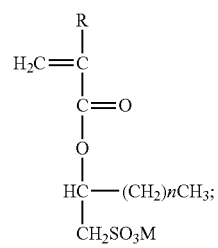

a p-styrene sulfonate C3 monomer:

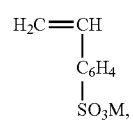

and an isoprene sulfonate C4 monomer:

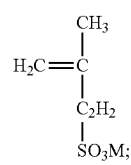

and wherein:
  M is $Na^+$ or $K^+$;
  R is H or $CH_3$;
  n=0, 1 or 2;
  the molar ratio of the A monomer, B monomer and C monomer is in the range of (1-50):1:(0.5-60); and the relative molecular weight of the copolymer is from 100,000 to 700,000,
  wherein the molecular weight regulator comprises a $C_3$-$C_{12}$ mercapto compound or a $C_3$-$C_{12}$ alcohol compound, wherein the molecular weight regulator is in an amount of (0.1-2.0) wt % based on the amount of monomers;
  wherein the initiator comprises an oxidation-reduction initiator in an amount of (0.1-3.0) wt % based on the amount of monomers, and wherein the oxidation-reduction initiator comprises an oxidant and a reductant at a weight ratio in the range of (0.5-3.0):1, respectively.

9. The method of claim 8, wherein the copolymer is of general formula 1 (A+B1+C2); and wherein the ratio of the monomers added is within the range of 1:(2-8):(2-10) for acrylic acid: acrylamide: alkyl sulfonate containing acryloxy group, respectively.

10. The method of claim 9, wherein the ratio of the monomers added is within the range of 1:(3-6):(4-8).

11. The method of claim 8, wherein the copolymer is of the general formula 2a (A+B1+C1), 2b (A+B1+C3), or 2c (A+B1+C4); and wherein the ratio of the monomers added is within the range of 1:(2-8):(3-12) for acrylic acid:acrylamide: alkenyl sulfonate C1 or p-styrene sulfonate C3 or isoprene sulfonate C4, respectively.

12. The method of claim 11, wherein the ratio of the monomers added is within the range of 1:(3-6):(4-10).

13. The method of claim 8, wherein the copolymer of the general formula 3a (A+B2+C1), 3b (A+B2+C3), or 3c (A+B2+C4), and wherein the ratio of the monomers added is within the range of 1:(2-10):(3-25) for 2-acrylamido-dodecyl sulfonate:acrylamide:alkenyl sulfonate C1 or p-styrene sulfonate C3 or isoprene sulfonate C4, respectively.

14. The method of claim 13, wherein the ratio of the monomers added is within the range of 1:(4-9):(5-22).

15. The method of claim 8, wherein the copolymer is of general formula 1 (A+B1+C2), 2a (A+B1+C1), 2b (A+B1+C3), or 2c (A+B1+C4); and wherein the molecular weight regulator comprises a $C_3$-$C_{12}$ mercapto compound in an amount of (0.1-1.0) wt % based on the total amount of the monomers, respectively.

16. The method of claim 8, wherein the copolymer is of general formulas 3a (A+B2+C1), 3b (A+B2+C3), or 3c (A+B2+C4); and wherein the molecular weight regulator comprises a $C_3$-$C_{12}$ alcohol compound in an amount of (0.2-1.0) wt % based on the total amount of the monomers, respectively.

17. The method of claim 8, wherein the oxidant in the initiator is at least one selected from the group consisting of potassium persulfate, ammonium persulfate, and hydrogen peroxide.

18. The method of claim 8, wherein the reductant in the initiator is at least one selected from the group consisting of sodium hydrogen sulfite, sodium sulfite, sodium thiosulphate, tetramethylethylenediamine, ferrous chloride, and cuprous chloride.

19. The method of claim 8, wherein the initiator for a copolymer of general formula 1 (A+B1+C2) is in an amount of (0.4-3.0) wt % based on the amount of the monomers, and wherein the weight ratio of the oxidant to the reductant is in the range of (0.5-2.0):1.

20. The method of claim 8, wherein the initiator for a copolymer of general formula 2a (A+B1+C1), 2b (A+B1+C3), or 2c (A+B1+C4) is in an amount of (0.4-3.0) wt % based on the amount of monomers, respectively; and wherein the weight ratio of the oxidant to the reductant is in the range of (0.5-3.0):1.

21. The method of claim 8, wherein the initiator for a copolymer of general formula 3a (A+B2+C1), 3b (A+B2+C3), or 3c (A+B2+C4) is in an amount of (1.0-3.0) wt % based on the amount of monomers, respectively; and wherein the weight ratio of the oxidant to the reductant is in the range of (0.5-2.0):1.

22. The method of claim 8, wherein:
the starting temperature of the polymerization reaction for the copolymer is between (20-70)° C., and the reaction temperature is between (50-95)° C.;
the pH of the polymerization system for the copolymer of general formula 1 (A+B1+C2) is between 9.0-11.0;
the pH of the polymerization system for the copolymer of general formula 2a (A+B1+C1), 2b (A+B1+C3), or 2c (A+B1+C4) is between 8.5-10.0;
the pH of the polymerization system for the copolymer of general formula 3a (A+B2+C1), 3b (A+B2+C3), or 3c (A+B2+C4) is between 8.5-11.0;
the polymerization reaction time of the said copolymer of general formula 1 (A+B1+C2) is between (10-25) minutes;
the polymerization reaction time of the said copolymer of general formula 2a (A+B1+C1), 2b (A+B1+C3), 2c (A+B1+C4) is between (8-28) minutes; and
the polymerization reaction time of the said copolymer of general formula 3a (A+B2+C1), 3b (A+B2+C3), 3c (A+B2+C4) is between (2-10) minutes.

* * * * *